United States Patent [19]

Marceno

[11] 4,052,034
[45] Oct. 4, 1977

[54] BAKING DEVICE

[76] Inventor: Josephine Marceno, 2719 Paulding Ave., Bronx, N.Y. 10469

[21] Appl. No.: 637,731

[22] Filed: Dec. 4, 1975

[51] Int. Cl.² .............................................. A21C 9/06
[52] U.S. Cl. ................................... 249/110; 249/130; 249/203; 249/DIG. 1
[58] Field of Search ................. 249/60, 109, 110, 203, 249/129, 130, 131, 132, DIG. 1, 92, 85, 105, 107, 141; 99/DIG. 15, 450.1, 450.6, 450.7, 450.8, 645; 220/21, 22, 22.1, 22.2; 141/100; 425/247; 426/128, 120, 113, 115, 119, 523, 279, 283, 249

[56] References Cited

U.S. PATENT DOCUMENTS

| 545,216 | 8/1895 | Willey | 249/DIG. 1 |
| 587,728 | 8/1897 | Griffith et al. | 249/110 |
| 890,934 | 6/1908 | Rudgear | 249/109 |
| 1,803,734 | 5/1931 | Sherer | 249/203 |
| 2,130,533 | 9/1938 | Barton | 426/523 X |
| 2,659,320 | 11/1953 | Browne | 99/450.8 |
| 2,664,054 | 12/1953 | Galvin | 99/450.8 |
| 3,392,685 | 7/1968 | Briggs | 141/100 |
| 3,598,175 | 8/1971 | Olsson et al. | 249/110 |

Primary Examiner—J. Howard Flint, Jr.
Assistant Examiner—W. R. Briggs
Attorney, Agent, or Firm—Allen D. Brufsky

[57] ABSTRACT

A baking pan insert that is especially adapted for the baking of cupcake and the like and is adapted to allow the baker to fill each cupcake with a differing filling while the same are already in the pan.

7 Claims, 4 Drawing Figures

BAKING DEVICE

BACKGROUND OF THE INVENTION

This invention relates to a baking pan insert; more particularly to an insert for baking multiple cupcakes or the like wherein each individual cake can be filled with filling after having been placed in the pan and moreover, where differing fillings may be used, both with respect to each cake as well as to all the cakes.

The prior art teaches a variety of baking pans, for example, those disclosed in U.S. Pat. Nos: 2,028,671; 2,454,054; 2,496,964; 2,546,800; 2,598,789; 2,628,738; 2,658,643; 3,837,560; and others. All of the foregoing, however, enjoy the common deficiency that the cake filling cannot be put into the cake after the cake dough has once been put into the mold.

SUMMARY OF THE INVENTION

It is accordingly an object of the instant invention to avoid one or more drawbacks of the prior art.

It is another object of the invention to provide for an improved baking dish insert, having the attributes as abovedescribed.

It is a further object to provide for the same at relatively little cost thereby making it generally available.

These and other objects and advantages of the invention will become more apparent from the following detailed disclosure and claims and by reference to the accompanying drawings, in which:

Figure 1:
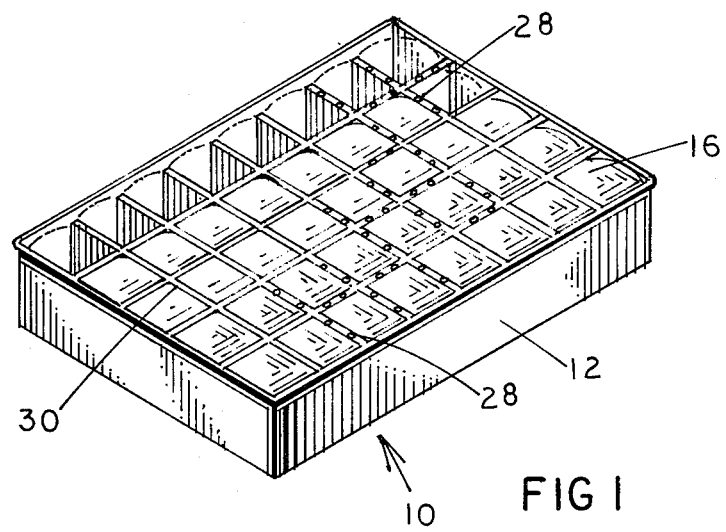
FIG. 1 is a perspective view of a baking pan with the insert and cakes therein.
Figure 2:
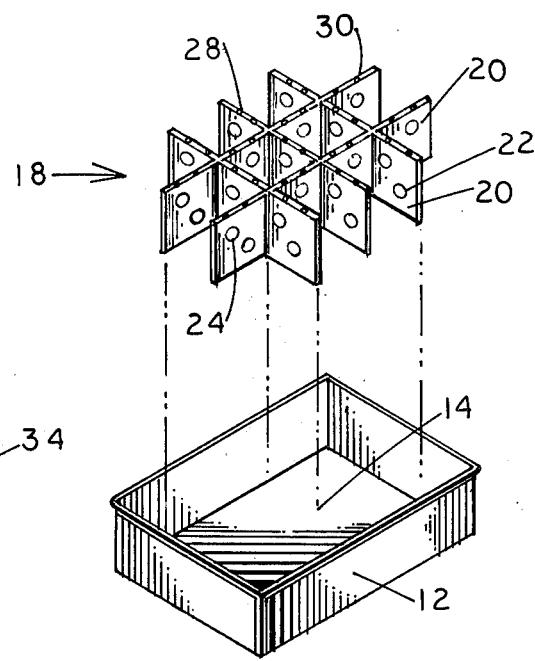
FIG. 2 is an expanded perspective view.
Figure 4:
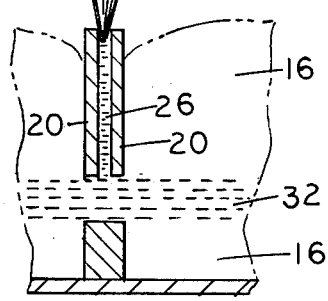
FIG. 4 is a side sectional view of the insert as employed.
Figure 3:
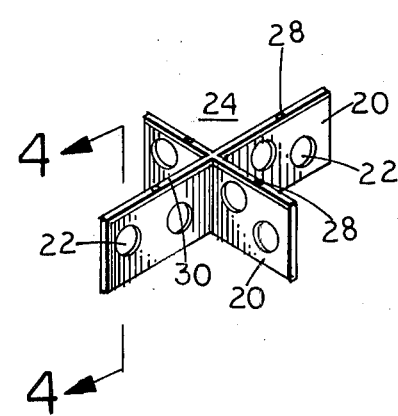
FIG. 3 is a side elevational view of a portion of the insert.

Broadly speaking, the instant invention includes the provision of a partition strip especially adapted for use with baking pans, comprising a plurality of opposing and intersecting walled members, each of the members defining at least one aperture on the wall, each of the members including a substantially centrally disposed channel in communication with the aperture, the channel including at least one inlet port disposed on the top portion of the wall member, the inlet port adapted to receive a quantity of cake filling, the filling adapted to travel through the channel and exit through the aperture into dough disposed between the walled members.

DETAILED DISCLOSURE

Referring more particularly to the drawings there is shown a conventional baking pan 10 that generally has walled sides 12, a bottom portion 14 and an open top portion to receive the dough 16. Most pans 10 are adapted to receive a series of dividers for making multiple cup cakes or the like. Instantly, the divider 18 encircles a plurality of interfitting partition strips 20 that are preferably spaced apart from one another in parallel relation. The strips 20 can contain interlocking slots whereby the spacing between parallel sides can be adjusted or the strips 20 can be bonded together such that movement is not possible. Each strip 20 will preferably stand upright in the dish 10 substantially perpendicular to the bottom portion 14 thereof. Each strip 20 in essence forming a walled surface, each of said surfaces defining at least one aperture 22, preferably two, that communicates between the surface and the spaces 24 defined between opposing surfaces. Additionally, each partition or strip or slot 20 as defined will comprise a substantially centrally disposed channel 26 that communicates with the aperture 22 and with the top of the strip 20 by an opening 28 located on the top horizontal portion 30 of the strip 20. The channel 26 thereby being open at both ends thereof, one end forming a port or opening 28 located on the portion 30 and the opposite end communicating with the aperture 22. The strip 20 can be completely hollow if desired. Cake filling 32 is adapted to be injected into the cake 16 by forced injection by suitable means 34 at the port 28 whereupon it travels into and through the channel 26, through the aperture 22 and into the dough 16.

Since it is obvious that numerous changes and modifications can be made in the above-described details without departing from the spirit and nature of the invention, it is to be understood that all such changes and modifications are included within the scope of the invention.

I claim:

1. A baking pan including side walls and a bottom, a partition strip dividing the pan into discrete baking compartments comprising a plurality of opposing and intersecting walled members removably seated in said pan on said bottom between said side walls, each of said members having a wall and a top portion and defining at least one through aperture on its wall, said aperture communicating with two of said baking compartments, each of said members including a substantially centrally disposed channel in fluid communication with said aperture, said channel including one inlet port disposed on the top portion of said wall member in communication with said aperture, said inlet port being of such size to receive a quantity of cake filling, which can travel through said channel and exit through said aperture into dough disposed between said walled members.

2. The pan as defined in claim 1 wherein said opposing members are disposed in substantial parallel relation.

3. The pan as defined in claim 1 wherein said intersecting members are substantially perpendicular to each other.

4. The pan as defined in claim 1 having a substantially hollow center.

5. The pan as defined in claim 1 wherein said members are interlocking.

6. The pan as defined in claim 1 wherein said members are integrally bonded together.

7. The pan as defined in claim 1 wherein there are two inlet ports, two channels and two apertures, each inlet port communicating with a single channel and aperture.

* * * * *